June 1, 1954 H. A. VAN LOON 2,679,840
STONE CUTTING APPARATUS
Original Filed Sept. 12, 1949 3 Sheets-Sheet 1

HERBERT A. VAN LOON,
INVENTOR.

BY Hazard & Miller
ATTORNEYS.

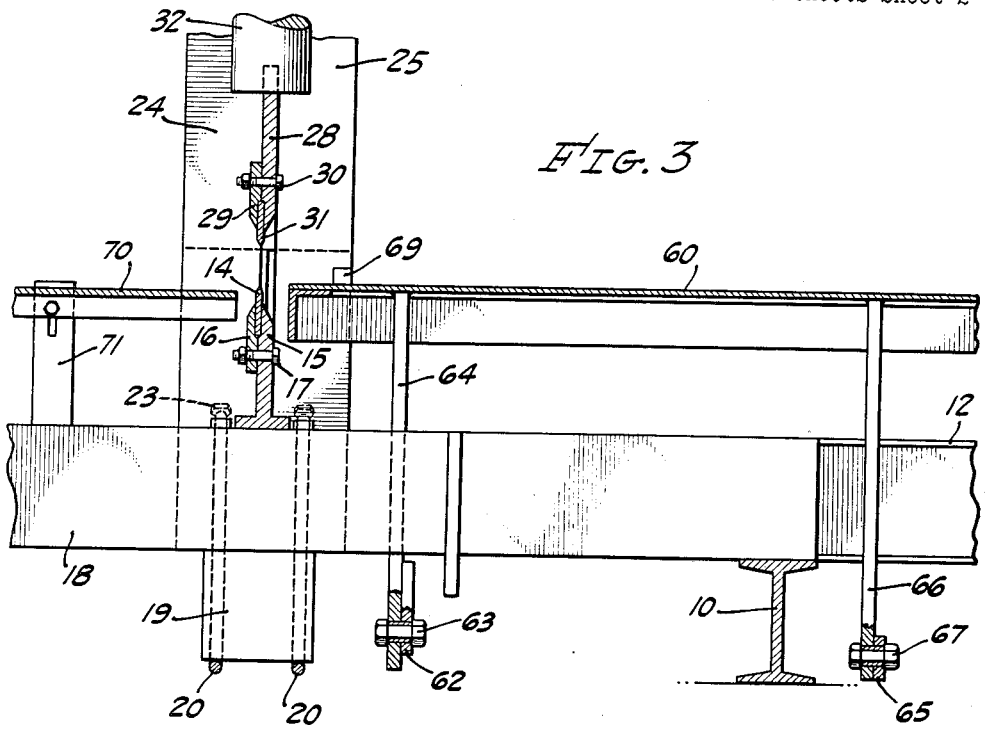
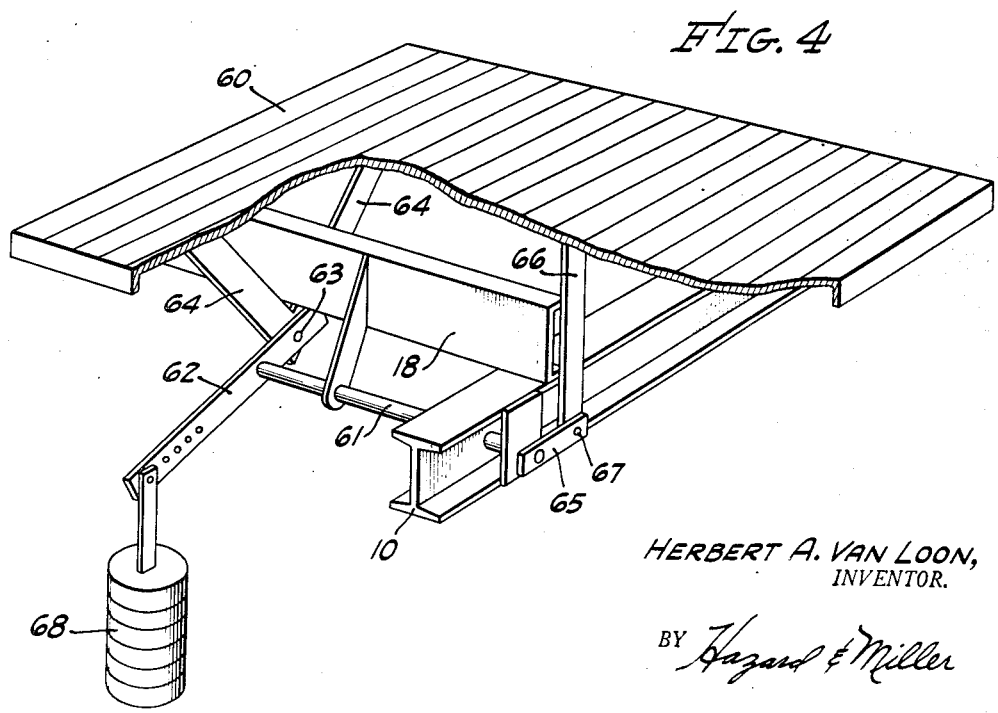

June 1, 1954　　　H. A. VAN LOON　　　2,679,840
STONE CUTTING APPARATUS
Original Filed Sept. 12, 1949　　　3 Sheets-Sheet 3

HERBERT A. VAN LOON,
INVENTOR.

BY
ATTORNEYS.

Patented June 1, 1954

2,679,840

UNITED STATES PATENT OFFICE 2,679,840

STONE CUTTING APPARATUS

Herbert A. Van Loon, Bishop, Calif.

Original application September 12, 1949, Serial No. 115,136. Divided and this application April 12, 1951, Serial No. 220,631

5 Claims. (Cl. 125—23)

This invention relates to an apparatus for cutting either natural or artificial stone. The application may be considered as a divisional application of my application for U. S. Letters Patent Serial No. 115,136, filed September 12, 1949, and now abandoned.

One object of the invention is to provide an apparatus for cutting stone wherein there is a stationary lower blade and a movable upper blade which is forced downwardly toward the stationary lower blade to cut or fracture a stone positioned therebetween.

Another object of the invention is to provide a stone-cutting apparatus having the above mentioned characteristics and wherein there is a descendable receiving table adjacent the lower blade on which the stone to be cut may be positioned and shifted to proper position with relation to the blades so that the cut may be caused to take place at the proper or desired location. The descendable table assumes a normal position slightly above the top of the lower blade and as the upper blade descends it causes the stone positioned on the table to depress the table and thus automatically lower the stone along with the table to engage the lower blade. Prior to the cutting operation as the top surface of the table is disposed above the top edge of the lower blade shifting of the stone is facilitated over the top of the lower blade.

Another object of the invention is to provide a stone-cutting apparatus wherein the upper blade is hydraulically forced downwardly toward the lower blade and upon fracturing the stone the upper blade will be caused to automatically return to its uppermost position and remain therein until a conscious manual operation takes place to cause a subsequent lowering of the upper blade. With this type of an arrangement stones of varying thicknesses may be cut or fractured without requiring adjustments to be made for different thicknesses.

With the foregoing and other objects in view, which will be made manifest in the following detailed description and specifically pointed out in the appended claims, reference is had to the accompanying drawings for an illustrative embodiment of the invention, wherein:

Fig. 3 is a partial view in vertical section on an enlarged scale taken substantially on the line 3—3 upon Fig. 2;

Fig. 4 is a partial view in perspective, parts being broken away and shown in section, illustrating details of construction of the descendable table;

Figure 1:
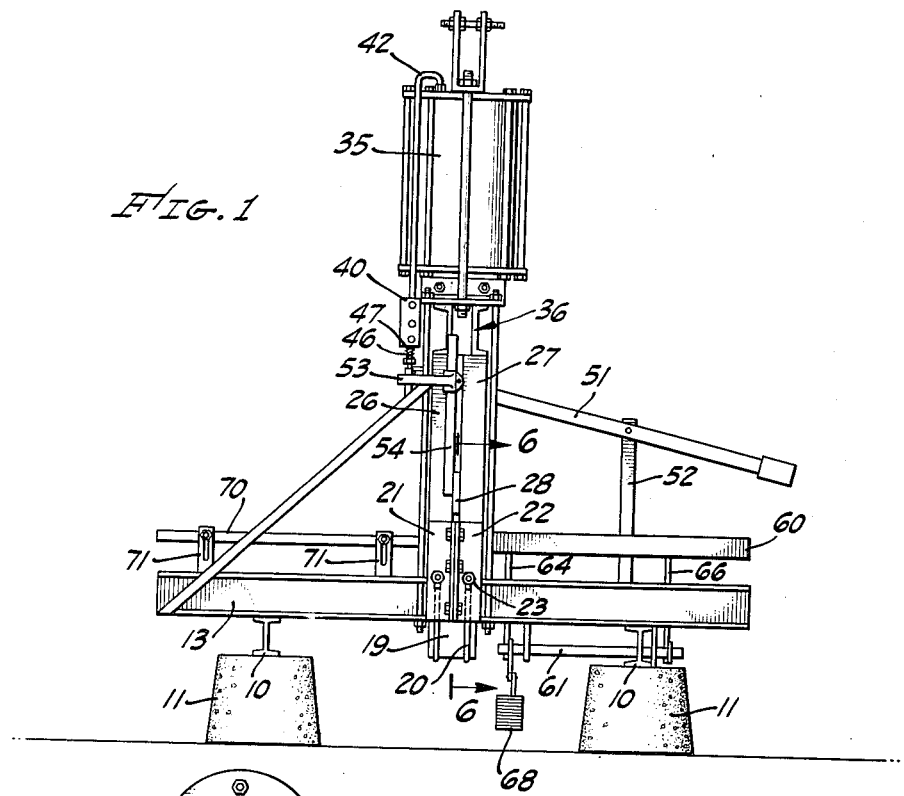
Figure 1 is a view in side elevation of the apparatus embodying the present invention.

Referring to the accompanying drawings wherein similar reference characters designate similar parts throughout, the improved apparatus comprises a suitable frame shown as consisting of lower I-beams 10 supported on a suitable foundation 11. These I-beams in turn support longitudinal beams 12 and 13.

The lower blade is indicated at 14 (see Fig. 3) and is stationarily mounted on the longitudinal beams 12 and 13 such as by a blade-holder 15. This blade-holder preferably has a detachable retaining plate 16 bolted thereto as by bolts 17 so that the blade 14 can be removed and replaced whenever occasion requires.

The blade-holder 15 is preferably supported or strengthened at its center against deflection such as by a strut made up of members 18 and 19 (see Fig. 2) which, in turn, are supported by tension bars 20. These tension bars extend through the longitudinal beams 12 and 13 and through flanges of pairs of angle irons secured thereto. One such pair of angle irons is indicated at 21 and 22 on Fig. 1. The ends of the tension bars are preferably equipped with adapters and with nuts 23 enabling the tension of the tension bars to be adjusted so as to support the center of the blade-holder 15 against deflection.

Figure 2:
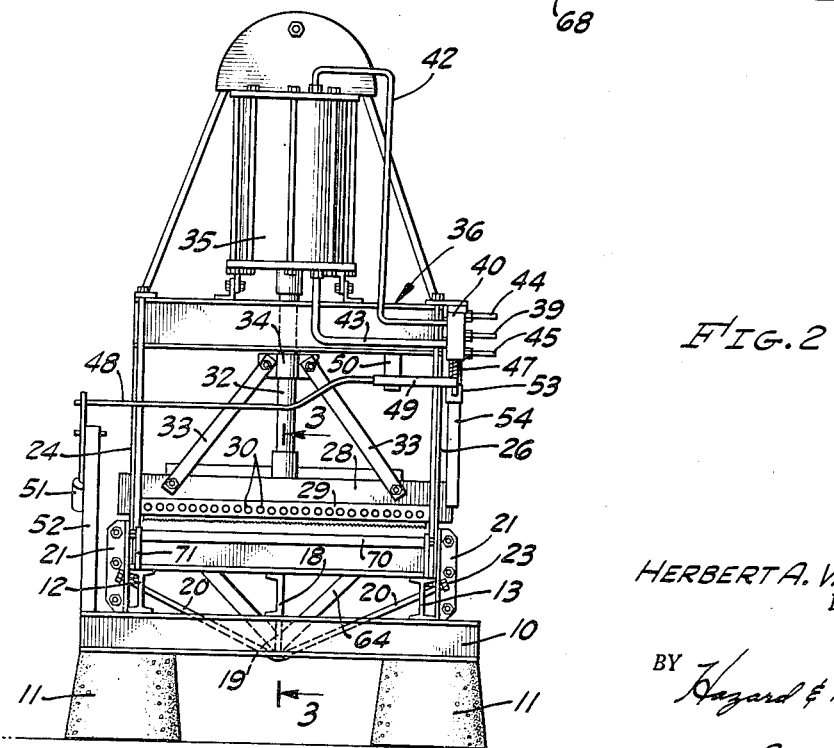
Fig. 2 is an end view in elevation of the same.

At each side of the frame there are pairs of spaced guide members, the guide members of one pair being indicated at 24 and 25 (see Fig. 3) and the guide members of the opposite pair being indicated at 26 and 27 (see Fig. 1). An upper or movable blade-holder 28 has its ends fitting between the guides 24 and 25 and 26 and 27 so as to be vertically guided thereby. This blade-holder is preferably equipped with a retaining plate 29 but is detachably secured in position such as by bolts 30 to clamp the movable blade 31 thereon and enable its removal and replacement when occasion requires.

The movable blade-holder is vertically reciprocated by means of a piston rod 32, the lower end of which may be secured to the blade-holder 28. Braces 33 may also be bolted to the blade-holder 28 and to a collar 34 on the piston rod.

As a means for reciprocating the piston rod 32 a hydraulic cylinder 35 is mounted on top of the frame such as by a base structure generally indicated at 36. This cylinder has a piston 37 disposed therein to which the piston rod 32 is secured. A pump and liquid reservoir 38 delivers liquid under pressure through a conduit 39 to a valve cylinder 40 within which is reciprocable a valve 41. Conduits 42 and 43 connect the valve cylinder 40 to the top and bottom of the hydraulic cylinder 35, respectively. Return conduits 44 and 45 connect the valve cylinder 40 with the pump and reservoir 38.

Figure 5:
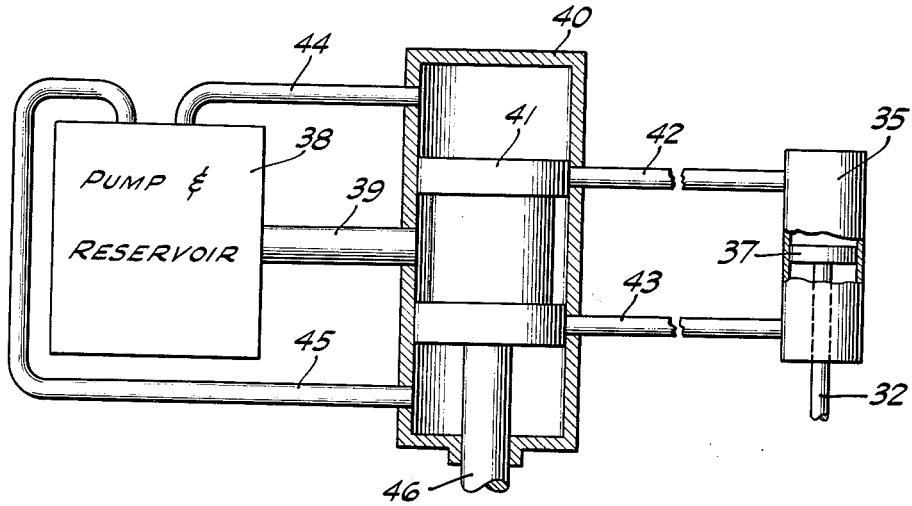
Fig. 5 is a diagrammatic view of the hydraulic apparatus employed to effect a raising and lowering of the upper blade.

In the position shown in Fig. 5, no fluid is permitted to flow from the pump and reservoir 38 to or from the hydraulic cylinder 35 and in this position the piston 37 is hydraulically locked in the position that it assumes. If the valve 41 is shifted upwardly from the position shown in Fig. 5, fluid under pressure may flow from the conduit 39 through the conduit 42 to the top of the hydraulic cylinder 35. Fluid in the bottom of the cylinder 35 may return through conduits 43 and 45. Consequently if the valve is displaced upwardly from the position shown in Fig. 5, the piston 37 and consequently the upper blade 31 will descend.

Conversely, if the valve 41 is displaced downwardly from the position shown, hydraulic fluid may flow through the conduit 39 and conduit 43 to the bottom of the cylinder 35 and fluid above the piston 37 may return through conduits 42 and 44. In this position of the valve 41 the piston and consequently the upper blades will be moved upwardly.

The valve 41 has a stem 46 projecting from the valve cylinder 40. This stem is surrounded by a compression spring 47 which urges the stem and valve 41 downwardly or into a position wherein the piston 37 will be forced upwardly.

As a means for manually displacing the valve 41 from the position shown there is a lever 48 pivoted at 49 on a bracket 50 on the frame. This lever is, in turn, actuated by a manual lever 51 pivoted on a suitable support indicated at 52. The end of the lever 48 is engageable with the end of the stem 46. The stem 46 is also engageable by a stop 53 that is adjustably mounted on an arm 54 carried by the upper blade-holder.

When it is desired to cause the upper blade to engage and crack or cut a stone, the swinging or free end of the lever 51 is lifted. This causes the lever 48 to swing about its pivot 49 in a counterclockwise direction, as viewed in Fig. 2, pressing the stem 46 upwardly. When the valve 41 is thus shifted upwardly hydraulic pressure is supplied to the top of the cylinder 35 forcing the piston 37 and the upper blade downwardly. As soon as the operator hears the fracture of the stone he releases the lever 51, allowing the compression spring 47 to become effective to shift the valve 41 downwardly. The downward displacement of the valve 41 as previously explained causes pressure to be supplied to the bottom of the cylinder 35 to cause the upper blade to be lifted. The arm 54 together with the stop 53 has, of course, moved downwardly with the upper blade and will be returned upwardly with the upper blade. The upper blade consequently continues rising until the stop 53 engages the stem 46 and returns the valve 41 to the neutral position shown in Fig. 5. In that position the piston 37 is stopped in its ascent and is, in effect, hydraulically locked in position until the free end of the lever 51 is subsequently lifted in making a subsequent cut.

A feature of the invention concerns the receiving table 60 disposed on the forward side of the machine. This table is designed to have the stone that is to be cut positioned thereon and it assumes a normal position slightly above the top edge of the lower blade 14. The table 60 is descendable, however, and to this end. A rocker shaft 61 is rotatably mounted on the frame. This rocker shaft carries a crank 62 which is rigidly secured thereto. It is pivotally connected as at 63 to the lower ends of braces 64 secured to the bottom of the table. The rocker shaft also carries a second crank indicated at 65 that is pivotally connected to the lower end of a vertical brace 66 as at 67. The pivots 63 and 67 are approximately equi-distant from the axis of rotation of the rocker shaft 61 so that both ends of the table will rise and fall evenly. On the crank 62 a counterweight 68 is adjustably mounted. This counterweight may be adjusted toward and away from the axis of rotation of the rocker shaft 61 and also different weights may be hung thereon. The counterweight is so adjusted that when the slab of stone to be cut is positioned on the table 60 the table will remain in its uppermost position as limited by a stop 69 on one of the guides 25. In other words the weight of the slab of stone to be cut is not ordinarily sufficient to depress the table 60 below its uppermost position which is above the lower blade 14. Consequently the slab may be shifted on the table 60 to any desired position and in so doing the protruding or overhanging portion of the slab that overhangs the blade 14 will not engage the blade. When the upper blade 31 is caused to descend it, of course, engages the overhanging portion of the stone and forces it downwardly. This causes the table 60 to descend and lowers the stone into engagement with the lower blade 14.

To the rear of the machine there is adjustably mounted a second table 70, this table being equipped with studs and nuts that are adjustable in slots in brackets 71. The table 70 is usually adjusted to a position slightly below the top edge of the lower blade 14. It is designed to receive that portion of the stone that is cut off from the slab that has been positioned on the table 60.

In the preferred arrangement the top edges of the angle irons 21 and 22 are so arranged as to be engaged by the upper blade-holder 28 and function as stops limiting downward movement of the upper blade 31 before it comes in contact with the lower blade 14.

Figure 6:
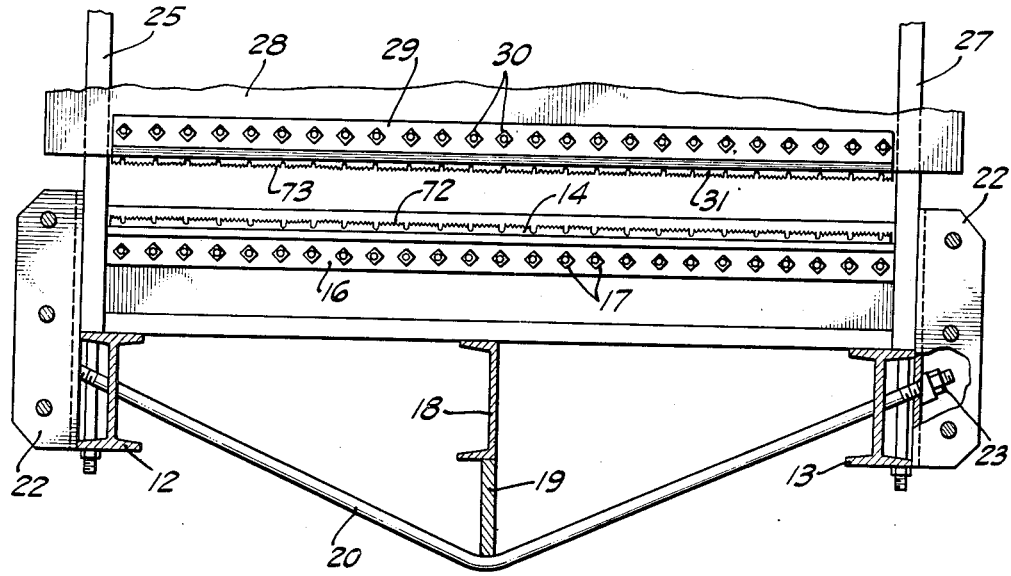
Fig. 6 is a partial view in section taken substantially on the line 6—6 upon Fig. 1 in the direction indicated.

As shown in Fig. 6, the blades 14 and 31 preferably present serrated edges as indicated at 72 and 73. This form of construction is highly preferred in many instances but is not essential. When the edges of the blades are toothed or serrated the ends of the teeth engage the stone to be cut and tend to penetrate the stone so that the stone will fracture along a line following the points of penetration. Such a construction is particularly advantageous when the top and bottom surfaces of the stone to be cut are not perfectly smooth. It is possible under certain circumstances to use smooth blades, that is, blades presenting smooth and continuous cutting edges.

From the above described construction it will be appreciated that the improved stone-cutting machine is highly advantageous in a number of respects. At the conclusion of each stone-cutting operation or the upper or movable blade 31 automatically returns to its uppermost position and is hydraulically locked in that position. Inasmuch as the upper blade returns the full stroke no adjustment of the machine is required in cutting stone of varying thicknesses. The stone to be cut is positioned on the receiving table 60 which is normally held above the lower or stationary blade 14 enabling the stone to be shifted on the table without any interference by the stationary blade. When the stone has been properly positioned the upper blade 31 is hydraulically forced downward and on engaging the stone the table 60 is caused to be depressed therewith until such time as downward movement of the stone is arrested by the lower blade 14. The continued application of pressure to the top of piston 37 causes the upper blade 31 to cooperate with the lower blade 14 in effecting a cut of the stone along the lengths of the blades. As soon as the fracture takes place the lever 51 is released which causes the upper blade to automatically return to its uppermost position and allows the counterweight 68 to be effective to lift the table 60 and the stone thereon clear of the stationary blade 14.

Various changes may be made in the details of the construction without departing from the spirit and scope of the invention as defined by the appended claims.

I claim:

1. An apparatus of the class described comprising a frame, a fixed lower blade, an upper blade, means for movably mounting the upper blade above the lower blade including a piston connected to the upper blade and a cylinder for the piston, means for supplying each end of the cylinder with fluid pressure, means controlling the flow of fluid pressure to the cylinder including a valve having a movable valve member, the movable valve member having an upper position in which fluid may be supplied to the upper side of the piston to urge the upper blade downwardly, a lower position in which fluid is supplied to the lower side of the piston to urge the upper blade upwardly and a neutral position in which fluid to and from the cylinder is stopped, a stop carried by the upper blade engageable with the movable valve member to shift the movable valve member to a neutral position when the upper blade is in its upper position, means for urging the valve member downwardly, and means for manually shifting the valve member into its upper position to cause the piston to move the upper blade downwardly and to carry the stop therewith.

2. An apparatus for cutting stone and the like comprising a fixed lower blade, a movable upper blade, means for moving the upper blade toward and away from the lower blade to cut stone placed between the blades, guides at the end of the lower blade, a blade actuated table adjacent the lower blade movable parallel to the plane of the movable upper blade and between the guides, a rocker shaft beneath the table and extending at right angles to the length of the lower blade, cranks on the rocker shaft, means pivotally supporting the table on the cranks for parallel movement relative to said upper blade and between the guides, an arm on the rocker shaft extending perpendicular thereto and underlying the edge of the table next adjacent to said lower blade, a counterweight on the arm for urging the table upwardly, and a stop on one of the guides limiting upward movement of the counterweight influenced table to a position above the top of the lower blade.

3. An apparatus for cutting stone and the like comprising a fixed lower blade, a hydraulically actuated upper blade movable toward and away from the lower blade to cut stone placed between the blades, a blade actuated table adjacent the lower blade, spaced guides for and common to the blades and the table, respectively, for limiting the upper blade and table to movement parallel relative to each other, a rocker shaft beneath the table intermediate the sides thereof and extending at right angles to the length of the lower blade, cranks on the rocker shaft, spaced braces pivotally supporting the table on the cranks, an arm on the rocker shaft extending perpendicular thereto and underlying the edge of the table next adjacent to said lower blade, a counterweight on the arm for urging the table upwardly, and a stop on one of the guides limiting upward movement of the counterweight influenced table to a position above the top of the lower blade.

4. In an apparatus for cutting stone and the like, a frame, a fixed lower blade on the frame, a movable upper blade, spaced guides restricting the upper blade to vertical movement, a blade actuated table disposed between said guides and limited thereby to movement parallel to said upper blade, a rocker shaft for the table underlying the same mounted on the frame, said shaft extending perpendicular to the blades, cranks on the rocker shaft pivotally connected to the table, and a counterweight on the rocker shaft for urging the table upwardly.

5. In an apparatus for cutting stone and the like, a frame, a fixed lower blade on the frame, a movable upper blade, spaced guides restricting the upper blade to vertical movement, a blade actuated table disposed between said guides and limited thereby to movement parallel to said upper blade, a rocker shaft for the table underlying the same mounted on the frame, said shaft extending perpendicular to the blades, cranks on the rocker shaft pivotally connected to the table, a counterweight on the rocker shaft for urging the table upwardly, and stop means on the guides for limiting upward movement of the table.

References Cited in the file of this patent

UNITED STATES PATENTS

| Number | Name | Date |
|---|---|---|
| 600,856 | Brinkman | Mar. 22, 1898 |
| 1,919,801 | Newsom | July 25, 1933 |
| 2,053,043 | Patterson | Sept. 1, 1936 |
| 2,368,138 | Hayden | Jan. 30, 1945 |
| 2,452,706 | White | Nov. 2, 1948 |
| 2,482,379 | Soderman | Sept. 20, 1949 |
| 2,514,352 | Solomito | July 4, 1950 |

FOREIGN PATENTS

| Number | Country | Date |
|---|---|---|
| 844,997 | France | May 1, 1939 |